(12) United States Patent
Drescher

(10) Patent No.: US 12,547,003 B2
(45) Date of Patent: Feb. 10, 2026

(54) DEVICE AND METHOD FOR DISPLAYING INFORMATION TO A USER

(71) Applicant: Blue Wonder Vermögensverwaltungs GmbH, Dresden (DE)

(72) Inventor: Wolfram Kurt Drescher, Dresden (DE)

(73) Assignee: Blue Wonder Vermögensverwaltungs GmbH, Dresden (DE)

( * ) Notice: Subject to any disclaimer, the term of this patent is extended or adjusted under 35 U.S.C. 154(b) by 0 days.

(21) Appl. No.: 18/715,910

(22) PCT Filed: Dec. 7, 2022

(86) PCT No.: PCT/EP2022/084721
§ 371 (c)(1),
(2) Date: Jun. 3, 2024

(87) PCT Pub. No.: WO2023/104852
PCT Pub. Date: Jun. 15, 2023

(65) Prior Publication Data
US 2025/0020929 A1    Jan. 16, 2025

(30) Foreign Application Priority Data

Dec. 7, 2021    (DE) .................. 10 2021 213 913.2

(51) Int. Cl.
*G02B 27/01*        (2006.01)
(52) U.S. Cl.
CPC .. *G02B 27/0172* (2013.01); *G02B 2027/0118* (2013.01)
(58) Field of Classification Search
CPC .................. G02B 27/0172; G02B 2027/0118
See application file for complete search history.

(56) References Cited

U.S. PATENT DOCUMENTS

| 2014/0085282 A1 | 3/2014 | Luebke et al. |
| 2014/0320399 A1* | 10/2014 | Kim ........................ G06F 3/005 |
| | | 345/156 |

(Continued)

FOREIGN PATENT DOCUMENTS

| WO | 2016/043820 A1 | 3/2016 |
| WO | 2019/185978 A1 | 10/2019 |

OTHER PUBLICATIONS

International Search Report issued in Int'l Application No. PCT/EP2022/084721, mailed Apr. 5, 2023, 3 pages.

(Continued)

*Primary Examiner* — Anne M Hines
(74) *Attorney, Agent, or Firm* — McDonnell Boehnen Hulbert & Berghoff LLP

(57) ABSTRACT

The disclosure relates to a device for displaying information to a user, including a support frame for mounting the device on a body part of a user, and including a shutter device which is mounted by the support frame and can be switched between a state of increased transparency and a state with lower transparency for visible electromagnetic radiation relative to the state of increased transparency. The device includes a projection device which is mounted by the carrier frame and by which visible electromagnetic radiation for the display of information can be emitted in such a way that can be perceived by the user. The shutter device and the projection device are arranged relative to one another in such a way that, during a state of reduced transparency, information can be displayed by the projection device for the user on a projection surface surrounded by the shutter device.

15 Claims, 8 Drawing Sheets

(56) References Cited

U.S. PATENT DOCUMENTS

2016/0170206 A1 6/2016 Osborne et al.
2021/0011290 A1 1/2021 Maimone et al.

OTHER PUBLICATIONS

Written Opinion issued in Int'l Application No. PCT/EP2022/084721, mailed Apr. 5, 2023, 5 pages.

* cited by examiner

DEVICE AND METHOD FOR DISPLAYING INFORMATION TO A USER

CROSS REFERENCE TO RELATED APPLICATIONS

The present application is a § 371 national stage of international application no. PCT/EP2022/084721, filed on Dec. 7, 2022, which claims priority to German application no. 10 2021 213 913.2, filed on Dec. 7, 2021, the entire contents of both of which are incorporated by reference herein.

FIELD

The device concerns a device and a method for displaying information to a user. In particular, the device can be designed as glasses or glasses element, so that in particular the technical field of multimedia glasses or data glasses is concerned.

BACKGROUND

In the course of the increasing mobility of users, the trend is fundamentally moving towards mobile end devices. In addition to the ubiquitous display of information, e.g. via smartphone displays, laptops, etc., the electronic display of information by means of head-mounted end devices, especially glasses, is gaining in importance.

Nowadays, eyeglasses are known to provide information to the user by means of displays or projections. In particular, desired information can be superimposed on a field of view of the user. Such glasses are known, for example, from WO 2016/043820 A1 by Google.

A disadvantage of such glasses is that the displayed information comprises disadvantages in the representation of information for a user in changing light conditions, i.e. when the incidence of light, e.g. the brightness or direction, of the external environment changes. In particular, these disadvantages are exacerbated by the fact that such glasses are usually worn for a long period of time, which increases the likelihood of being confronted with changing light conditions indoors, e.g., living room, office, or outdoors, e.g., park, nature. Furthermore, the user is often distracted and inattentive by the displayed information and does not perceive his surroundings to the required extent. Furthermore, one eye of the user may be exposed to dangerous UV radiation.

Furthermore, such glasses are usually energetically self-sufficient, i.e. they comprise an energy store which provides the energy to supply the electronic components of the glasses with energy and to operate them in order to display information to the user. Consequently, it is of importance to keep the energy requirements of the glasses as low as possible.

SUMMARY

Therefore, it is an object of the invention to provide a device, in particular a pair of glasses, by means of which the presentation of information to a user is improved and the safety of the user is increased during the use of the device.

This object is solved according to the invention by the objects of the independent claims. Advantageous further embodiments of the invention are indicated in the dependent claims, the description and the accompanying figures. In particular, the independent claims of one category of claims may also be further developed analogously to the dependent claims of another category of claims. Further embodiments and further embodiments will be apparent from the subclaims and from the description with reference to the figures.

The present invention comprises a device for displaying information to a user, having a support frame for mounting the device on a body part, in particular on the head, of a user, comprising a shutter device mounted by means of the support frame, which shutter device is switchable between a state of increased transparency and a state of lower transparency for visible electromagnetic radiation relative to the state of increased transparency, in particular in a repetitive manner, comprising a projection device which is mounted by means of the carrier frame and by means of which visible electromagnetic radiation for the display of information can be emitted in such a way that this can be perceived by the user, the shutter device and the projection device being arranged relative to one another in such a way that, during a state of reduced transparency, information can be displayed by means of the projection device for the user, in particular on a projection surface surrounded by the shutter device.

By means of such a device it is possible on the one hand to achieve an improved contrast of the information to be displayed. By means of the shutter device, the influence of the ambient light on the information displayed by means of the projection device can be kept low and the contrast can be improved. This is particularly the case if the "darkened" shutter device, i.e. the shutter device in the state of reduced transparency, can be used as a projection surface for displaying the information. At the same time, the user can perceive the environment during the period of increased transparency of the shutter device and thus be enabled to react to external circumstances.

In particular, the device can be designed as a pair of glasses or a spectacle element.

Visible electromagnetic radiation or visible light is light in the wavelength range from 350 nm to 800 nm.

A shutter device can be any device which is suitable for switching visible light from a state of increased transparency to a state of lower transparency and vice versa. In particular, in a state of increased transparency, more than 50%, in particular at least 80%, in particular at least 90%, in particular at least 95%, in particular at least 99% of the incident visible electromagnetic radiation can pass through the shutter device. In particular, in a state of low transparency, less than 50%, in particular at most 20%, in particular at most 10%, in particular at most 5%, in particular at most 1%, of the incident visible light, in particular no visible light, can pass through the shutter device. Advantageously, the state of increased transparency and the state of reduced transparency, i.e. the setpoint value of the transparency in the respective state is adjustable, in particular continuously. The set value of the increased transparency and/or the decreased transparency can depend, for example, on the selected shutter device, in particular on the quality of a selected shutter glass.

The shutter device can be designed to absorb UV radiation independent of the state of increased or decreased transparency. Providing reduced transparency for UV radiation is advantageous to protect the user's eye from the incidence of UV radiation.

In particular, the shutter device is designed in such a way that it can be used to set a switching frequency of 1 to 10 KHz. The switching frequency can be selected depending on the intended mode of operation of the device. The switching frequency can be selected significantly higher than an image reproduction frequency. In an advantageous variant, the switching frequency is equal to an image reproduction frequency. This provides an energy-optimized operation of the shutter device.

For a temporally separated perception of information and the environment by the user, the switching frequency can be 1 Hz to 25 Hz, preferably 1 Hz to 20 Hz. If this temporally separated perception is not desired for the user, but rather a blending image of information to be reproduced and the environment, higher frequencies can also be selected, in particular 50 Hz to 120 Hz and higher.

A shutter device can in particular comprise a switchable, in particular flat, liquid crystal element, by means of which the state of increased transparency and decreased transparency can be provided. Advantageously, the shutter device can comprise a fast optical shutter (FOS). This is a liquid crystal-based optical shutter in which the transparency can be controlled by means of an externally applied voltage. The use of a fast optical shutter has the advantage that it comprises no moving parts, is completely vibration-free and compact. These can be obtained, for example, from the company LC Tec. However, the shutter device can also be designed in a different way to enable the provision of the increased and decreased transparency.

The projection device can be designed to project information, e.g. images, a sequence of images or texts, onto a projection surface comprising the device so that the user can perceive the information. This projection surface is advantageously arranged—in the direction of the beam path starting from the projection device—between the projection device and the user, in particular downstream of the shutter device in the direction of the beam path. In particular, the projection surface can be comprising the shutter device and in particular be arranged on the side of the shutter device facing the user. Alternatively, the projection device can also be designed in such a way that information to be displayed can be projected directly into the eye of a user without intermediate switching of a projection surface, the shutter device comprising a state of reduced transparency during the projection of information into the eye of the user.

In particular, the projection device can use a laser or laser diodes, or light emitting diodes (LEDs), which comprise a high efficiency in the conversion of electrical energy into optical signals, to display the information. This serves a low energy consumption and a long service life before an energy storage of the device must be changed again or filled or charged.

The mounting of the projection device and the shutter device on the carrier frame serves the compactness and mobility of the device. The device thus forms in its entirety a compact component which comprises all the necessary functionalities for displaying information to the user, is mobile and can be permanently carried as an everyday object.

In a further embodiment of the invention, the visible electromagnetic radiation emittable by means of the projection device for the display of information is emittable with a light signal sequence with a light intensity frequency, in particular pulsed, wherein the light intensity frequency is the reciprocal of a sequence of a time interval with increased light intensity, a time interval with reduced light intensity following this time interval to a time interval with increased light intensity following this time interval, and the increased light intensity and the reduced light intensity differ by at least a factor of 5, in particular by at least a factor of 10, in particular by at least a factor of 100. In particular, the light intensity frequency may be at most 25 Hz, preferably between 1 Hz and 25 Hz, if a temporally separated perception is desired for the user. However, the light intensity frequency can also be selected to be significantly higher for a blending display. Advantageously, the light intensity frequency can be selected in the range between 50 Hz and 120 Hz, which enables good image quality with comparatively low energy requirements. In particular, the light intensity frequency can be selected in the range between 100 Hz to 400 Hz, in particular between 200 Hz to 1 kHz, in particular between 1 kHz to 10 KHz.

By increasing and decreasing the light intensity, in particular in a pulsed manner, the contrast for the user can be further increased, especially in the time intervals of the increased light intensity, i.e. during the display phase, while only a reduced amount of energy is required in the emission phase of the decreased light intensity. This further improves the contrast and significantly reduces the energy consumption of the device.

The light intensity frequency of the projection device is preferably presettable, in particular by a control device, so that the shutter device can be adjusted to it. The light intensity frequency is advantageously variably adjustable, in particular by means of the control device.

If a separately perceptible display of the information displayed by the projection device and the environment is desired for the user, the light intensity frequency can be at most 25 Hz. Preferably, the light intensity frequency can be selected from a range of 1 Hz to 25 Hz, in particular from a range of 1 to 20 Hz, more particularly from a range of 5-15 Hz.

If a mixed image of information displayed by the projection device and the environment is considered suitable or desired for the user, also referred to as a blending display, a light intensity frequency and a switching frequency matched thereto of more than 25 Hz, in particular of more than 50 Hz, in particular between 100 Hz and 1000 Hz, in particular 120 Hz, can also be provided.

Low ratios of increased light intensity to decreased light intensity of, for example, 5 or 10 can be used if the contrast is already sufficiently good for the user at this ratio. This is especially the case if the environment of the user is sufficiently dark. Otherwise, much higher ratios of increased light intensity to decreased light intensity can be used, e.g. 100, 200, 500, 1000, 5000 or 10000, especially in case of high ambient brightness.

Preferably, the setpoint for the increased light intensity and/or the setpoint for the lowered light intensity is adjustable.

In addition to the light intensity frequency, the term light signal sequence also comprises the arrangement of the temporal distribution as well as the level of the light intensity within a period length. In other words, the term light signal sequence is to be understood as an umbrella term that defines not only the period length of increased and decreased light intensity, i.e. the light intensity frequency $f=1/T$, but also how the increased light intensity and the decreased light intensity are distributed over time within the period length $T=1/f$. Furthermore, the term also comprises the "amplitude" of the increased or decreased light intensity within the period length.

In a further embodiment of the device, the duration of the time interval of increased light intensity is at most $\frac{1}{5}$, in particular at most $\frac{1}{10}$, in particular at most $\frac{1}{20}$, in particular at most $\frac{1}{50}$, in particular at most $\frac{1}{100}$, in particular at most $\frac{1}{500}$ of the duration of the time interval of decreased light intensity. By reducing the ratio of the time intervals of increased light intensity to decreased light intensity, the required energy can be reduced while improving the contrast for the display of information.

In a further embodiment of the device, a switching frequency of the shutter device and the light signal sequence of the projection device can be synchronized by means of a control device in such a way that the switching frequency of the shutter device and the light intensity frequency of the projection device substantially coincide or are an integer multiple of each other, in particular further in such a way that the time interval of the reduced transparency overlaps with the time interval of the increased light intensity. Switching frequency is understood as the reciprocal of the sequence of a time interval from a state of increased transparency to a state of decreased transparency and back again to a state of increased transparency. Multiples of switching frequency or light intensity frequency can be advantageously applied in particular when the switching dynamics of the projection device and the shutter device differ significantly, e.g. sluggish switching behavior versus fast switching behavior.

By synchronizing the light intensity frequency and the switching frequency, the operation of the shutter device and the projection device can be combined in such a way that the display can be optimized for the user while the user can still perceive the environment. In particular, during the time interval of reduced transparency, i.e. the state of reduced transparency, an increased light intensity can be provided to display the information. By matching the shutter device to the projection device in their operation, the influence of ambient light is further reduced and, in combination with the increased light intensity of the projection device, the contrast for the user is further improved.

In an advantageous embodiment of the device, the switching frequency of the shutter device and the light signal sequence of the projection device, in particular the light intensity frequency and/or the state of reduced transparency to the time intervals of increased light intensity, can be synchronized by means of a phase-locked loop. The control by means of a phase-locked loop is preferably performed by a control device. By means of the phase-locked loop, the state of increased transparency of the shutter device can be phase-locked to the state of increased light intensity of the projection device. Preferably, the phase control is performed based on an input signal from the projection device. On this basis, the shutter device can be operated in phase and tuned to the projection device. Alternatively, an input signal of the shutter device can be used to tune the light intensity variations to the operation of the shutter device by means of the phase-locked loop. A phase locked loop, also called phase lock loop or PLL, is a particularly simple and efficient way to synchronize the operation of the shutter device and the operation of the projection device. In particular, an input signal from the technically more inert of the shutter device and the projection device can be used as an input variable for the phase-lock-loop, so as not to overload the inert device. The dynamics of the more inert device thus sets the "clock" or acts as the master for the operation of the device. In particular, the on-times of the inertial device can be used to specify the off-times for the "faster" device.

In a further embodiment of the device, the switching frequency of the shutter device and the light signal sequence of the projection device can be synchronized in such a way that, in particular in a repetitive manner, the state of increased light intensity is temporally arranged, in particular completely, within a time interval of decreased transparency, in particular the duration of the time interval of decreased transparency is greater than or substantially coincident with the duration of the time interval of increased light intensity. In other words, the increased light intensity is preferably present only when the reduced transparency is simultaneously present. This results in a simultaneous optimization of the contrast for the user and the energy consumption of the device or the projection device.

Preferably, the duration of a time interval for increased light intensity, in particular of a pulse with increased light intensity, is shorter than the duration of the time interval of the reduced transparency of the shutter device. This ensures that during the state of reduced transparency, i.e. during the period in which the information is visible to the user, the greatest possible contrast is achieved for the user, in particular between the darkened shutter device, acting in particular as a projection surface, and the information displayed with increased light intensity. It is particularly advantageous if the time interval of the increased light intensity and the state of reduced transparency coincide in time and match, i.e. are as close as possible to coincidence. For this purpose, a threshold value for the increased transparency and the increased light intensity can be used, which serves as a starting point for the "simultaneity" of the reduced transparency and the increased light intensity.

Ideally, both the time course of the decreased transparency and the time course of the increased light intensity comprise a rectangular progression. In practice, however, such a rectangular progression is difficult to realize. Due to the technical "inertia" of the shutter device and the technical "inertia" of the projection device, these usually comprise a time ramp when the transparency or the light intensity is changed, via which a desired value is set. This time ramp is used to change the transparency from a lower value to a higher value or from a higher value to a lower value. Similarly, the light intensity is changed from a lower value to a higher value and from a higher value to a lower value via a time ramp.

The ramps for the transparency and the light intensity can comprise different slopes in terms of amount, so that the state of reduced transparency and the desired increased light intensity are not present at the same time, although the shutter device as well as the projection device are switched "simultaneously".

This "different reaction speed" is preferably taken into account when synchronizing the projection device and the shutter device. For this purpose, a threshold value for the transparency and a threshold value for the increased light intensity can be determined, e.g. 10% deviation from the desired increased light intensity value or 10% deviation from the desired reduced transparency value. The control can then be performed in such a way that the respective threshold values are reached synchronously in time. The setpoint value of the increased transparency or the setpoint value of the increased intensity can also be used as the threshold value.

In a further advantageous embodiment of the device, the device comprises a first sensor for detecting a contrast-relevant ambient parameter, in particular an ambient brightness, wherein the shutter device and/or the projection device can be set on the basis of the ambient parameter determined, in particular the ambient brightness. Ambient brightness is the light intensity acting on the user from outside, e.g. due to sunlight, scattered light, artificial lighting, reflections, etc . . . .

In addition to the ambient brightness, other environmental parameters can be provided as environmental parameters, e.g. direction of the incident ambient light, position of the sun, etc. The first sensor comprising the device thus allows dynamic tracking of the contrast depending on contrast-relevant ambient parameters of the user.

In particular, depending on the sensed ambient parameters, especially the ambient brightness, can be changed individually or in combination: the set value for the increased light intensity, the duration of the time interval of the increased light intensity, the set value of the lowered light intensity, the duration of the time interval of the lowered light intensity, the set value of the increased transparency, the duration of the time interval of the increased transparency, the set value of the reduced transparency, the duration of the time interval of the reduced transparency, the light intensity frequency of the projection device, the switching frequency of the shutter device. In particular, a pulse width modulation of the increased light intensity and the reduced transparency can be provided by means of the control device, in particular in such a way that the contrast for the user is improved, in particular optimized, with simultaneous optimized energy efficiency.

For example, it is possible to reduce the increased light intensity to a lower level when the ambient brightness is low, e.g. at night. This allows the eye to adapt both to the information to be displayed and to the environment. At the same time, in the case of increased ambient brightness, for example in the case of corresponding sunlight, provision can be made to reduce the reduced transparency and increase the increased light intensity of the projection device. Similarly, the corresponding time intervals for decreased and increased transparency or the corresponding time intervals of decreased and increased light intensity can be adjusted, preferably synchronously. E.g. the time interval of the decreased transparency can be changed to the same extent, preferably also simultaneously, with the time interval of the increased light intensity. Likewise, this can be done vice versa.

Preferably, the aforementioned parameters of the projection device and/or the shutter device are set, in particular controlled, in such a way that, depending on the ambient parameter, in particular the ambient brightness, the display quality, in particular the contrast, is increased for the user and, at the same time, the energy consumption of the device—under the secondary condition of achieving a minimum contrast—is kept as low as possible. For this purpose, a device for measuring the contrast can be comprised by the device, which is connected to the control device and thus enables a control loop for a contrast setting, in particular a tracking of the contrast depending on the ambient brightness.

In a further embodiment, the device is designed to synchronize the shutter device with a light intensity frequency of a light signal sequence of an optical information source external to the device and to make visible electromagnetic radiation emitted by the optical information source external to the device optically perceptible to the user. This means in particular that the information provided by the optical information source external to the device is made available to the user during the time intervals of increased transparency. Thereby, the switching frequency of the shutter device is adapted to the light intensity frequency of the optical device-external information source.

Due to the fact that the optical information source external to the device is located in the user's environment, a high ambient brightness has a particularly negative effect on the display. In particular, the switching frequency of the shutter device can therefore be synchronized with the light intensity frequency of the optical device-external information source and the increased light intensity of the optical device-external information source can be selected to be sufficiently high. In parallel, the projection device may or may not be operated and, if operated, provide the information it provides during the time intervals of reduced transparency.

The light intensity frequency of the optical information source external to the device can be selected depending on the parallel operation of the projection device. If, in addition to the display of information provided by the optical information source external to the device, information is also displayed by means of the projection device, it is advantageous to limit the light intensity frequency of the optical information source external to the device to a maximum of 25 Hz.

However, if information is not to be displayed to the user simultaneously by means of the projection device and the optical device-external information source, the light intensity frequency of the optical device-external information source can be arranged in a range from 50 Hz to 1000 Hz, in particular in a range from 100 Hz to 1000 Hz, in order to improve the display.

The contrast can be increased by the shutter device in particular by the shutter device comprising an increased transparency, in particular being open, over a comparatively short time interval and comprising a reduced transparency, in particular being closed, over a time interval which is longer than the short time interval. Preferably, the time interval of the increased transparency is smaller by a factor of 10 than the time interval of the reduced transparency. In this way, the energy requirement of the optical information source external to the device can be kept low while at the same time improving the contrast for the user.

Optical information sources external to the device can be any external optical information sources, i.e. screens not comprised by the device, e.g. screens of computers, cell phones, data glasses or other display devices, projection surfaces external to the device, or e.g. also a projection device of another device according to an embodiment of the invention. This makes it possible, if the optical device-external comprises a light intensity frequency, to synchronize the operation of the shutter device with this optical device-external information source and thus also to enable an improved contrast when viewing optical device-external information sources.

In this embodiment of the device, the projection device is preferably arranged in such a way that it does not or only slightly interfere with the user's viewing of the optical device-external information source, i.e. allows the user to view the optical device-external information source as freely as possible.

In an exemplary further embodiment of the device, the device comprises a second sensor, in particular a photodiode, which is designed to detect a light intensity frequency of the optical information source external to the device, wherein the switching frequency and the light intensity frequency can be synchronized on the basis of the detected values of the second sensor. Again, the synchronization particularly comprises the time intervals of the increased light intensity of the optical device-external information source and the time intervals of the increased transparency of the shutter device within a repeating period length. In particular, synchronization occurs such that the time intervals of the increased light intensity of the optical device-external information source overlap with the time intervals of the increased transparency.

Here, too, a phase loop control can preferably be used for synchronization. For example, the control device feeds the shutter device based on the detected light intensity frequency such that the state of increased transparency always coincides with a phase of increased light intensity of the optical device-external information source.

In a further embodiment of the device, the device comprises a camera for detecting an optical information source external to the device, wherein the data detected by the optical information source external to the device are transmitted to the projection device, wherein the content of the optical information source external to the device can be acted upon by means of a light intensity frequency and can be reproduced for the user by means of the projection device, in particular synchronized with the shutter device. This makes it possible to improve the display also for optical information sources external to the device by means of the device, even if the optical information source external to the device itself does not comprise or cannot generate a light intensity frequency.

It is further advantageous if the device comprises a receiving device for receiving wirelessly transmitted information intended for display by means of the projection device. This further increases the mobility of the device and the information to be displayed can be made perceptible to the user at any location by means of the projection device. For the provision of information to be displayed, the data transmission methods known to the person skilled in the art can be used, for example in the short-range WLAN, Bluetooth, or also a transmission by means of the usual telecommunication standards, such as 3G, 4G, 5G, 6G etc.

The present invention also comprises a method for displaying information to a user by means of a device according to any of the preceding claims, wherein a light signal sequence comprising a light intensity frequency for displaying information is emitted by means of the projection device, wherein the switching frequency of the shutter device and the light intensity frequency are coordinated with one another in such a way that an increased light intensity is present in a time interval of reduced transparency, so that during this time interval information provided by the projection device for the user can be perceived, in particular as a projection on a projection surface surrounded by the shutter device. This provides a method which, on the one hand, enables information to be displayed to the user, while at the same time enabling the user to perceive his surroundings well.

In a further embodiment of the method, the light signal sequence emitted by the projection device is projected onto a projection surface comprised by the shutter device during the time interval of reduced transparency. In this way, a projection surface can be provided in a particularly simple manner. Apart from the projection surface comprising the shutter device, which can in particular be formed as the side of the shutter device, in particular shutter glasses, facing the user using the device, no additional elements for displaying the information are required.

In a further advantageous embodiment, a light signal sequence comprising a light intensity frequency is detected by an optical information source external to the device for displaying information to a user, wherein the switching frequency of the shutter device and the light intensity frequency of the projection device are synchronized to the detected light intensity frequency of the optical information source external to the device, and the information provided by the optical information source external to the device can be perceived by the user during a time interval in which an increased transparency of the shutter device and an increased light intensity of the optical information source external to the device are simultaneously present. This makes it possible for the user to receive information about the projection device, if desired, and about an optical information source external to the device at the same time.

With regard to the light signal sequence of the optical information source external to the device, the above statements apply accordingly to the light signal sequence of the projection device, i.e. to the light intensity frequency, the ratio of the increased light intensity and the decreased light intensity, the set value of the increased and the decreased light intensity and the duration of the time intervals of the increased and decreased light intensity.

In a further advantageous embodiment of the method, the tuning is performed such that there is an overlap of a time interval of the increased transparency with a time interval of the increased light intensity of the optical device-external information source, in particular provided by means of a phase-locked loop. Alternatively, or in combination, a tuning is performed such that there is an overlap of a time interval of the reduced transparency with a time interval of the increased light intensity of the projection device, in particular provided by means of a phase-locked loop. This allows a double synchronization as follows. On the one hand, the display by means of the projection device can be synchronized to the time intervals of decreased transparency, and at the same time the display by means of the optical device-external information can be synchronized to the time intervals of increased transparency, or the time intervals of increased transparency can be synchronized to the time intervals of increased light intensity of the optical device-external information source.

Preferably, the light intensity frequency of the projection device and the light intensity frequency of the optical device-external information source are the same, or an integer multiple of each other. In particular, the switching frequency of the shutter device and/or the switching frequency of the projection device can be adapted to the light intensity frequency of the optical device-external information source, for example to an external display. Subsequently, the light intensity frequency of the projection device can be adapted to the adapted switching frequency of the shutter device.

In particular, an adaptation is advantageously performed in such a way that, in particular in a repetitive manner, a time interval of the increased transparency is arranged completely within a time interval of the increased light intensity of the optical device-external information source and/or in such a way that, in particular in a repetitive manner, a time interval of the increased light intensity of the projection device is arranged completely within a time interval of the reduced transparency.

Furthermore, it is advantageous if a connection is established between the optical device-external information source and the device and the control device of the device can provide the optical device-external information source with a changed light intensity frequency, inter alia comprising a changed set value for the increased light intensity and/or a changed duration of the time interval for the increased light intensity and/or a changed light intensity frequency. Thus, by means of the control device of the device, the presentation of the information can be improved by optimizing the operating parameters of the optical device-external information source, in particular on the basis of an ambient parameter, in particular on the basis of the detected ambient brightness.

According to a further embodiment oft the invention, the device is adapted in such a form that the projection device transfers light to a waveguide as part of a projection surface which comprises an incoupling grating that couples light from projection device into the waveguide as propagating light which is further directed to an outcoupling grating to be observed by the user N, or wherein the projection device is integrated into an integral waveguide which comprises an integral image projector as projection device from which light is directed to an outcoupling grating to be observed by the user N.

BRIEF DESCRIPTION OF THE DRAWINGS

Advantageous embodiments of the invention are explained below with reference to the accompanying figures. They show.

The figures are only schematic representations and serve only to explain the invention. Identical or like-acting elements are indicated throughout by the same reference numerals.

DETAILED DESCRIPTION

Figure 1:
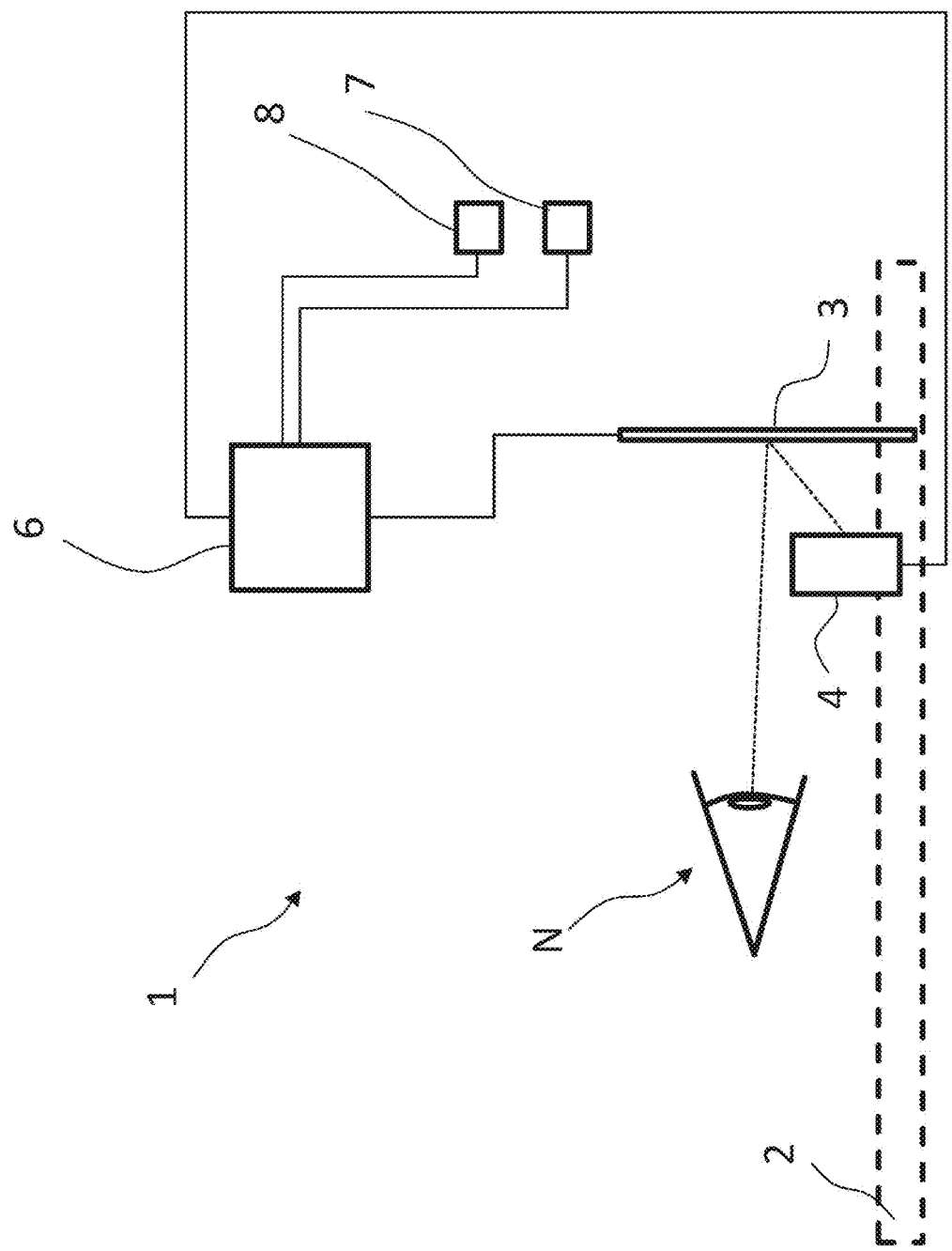
FIG. 1 is a schematic view of a functional arrangement according to one embodiment of the invention.

FIG. 1 shows a device 1 in the form of a spectacle element for displaying information to a user N. The user N is schematically indicated as the eye of a user N. The spectacle element 1 has a support.

The eyeglass element 1 comprises a support frame 2. A shutter device 3 is mounted on the carrier frame 2. This can be mounted indirectly, i.e. by means of further components of the device 1, or directly, i.e. directly, on the carrier frame 2.

Furthermore, a projection device 4 is mounted on the carrier frame 2, by means of which information can be displayed to a user N. The projection device 4 can also be mounted indirectly, i.e. by means of further components of the device 1, or directly, i.e. directly. The projection device 4 can also be mounted indirectly or directly on the support frame 2. This is a head-mounted display. The information to be displayed can be projected onto a projection surface by means of the projection device 4. This can be designed as part of the shutter device 3, as indicated in FIG. 1, or as a separate projection surface which is arranged between the user N and the shutter device 3, see FIG. 3.

If the shutter device 3 is in a state of reduced transparency, in particular closed, the information, e.g. an image, can be made perceptible to the user N in high contrast during this phase by means of the projection device 4 by projecting it onto the projection surface. Alternatively, it can be provided to project an information directly onto the retina of the user N without interposition of a projection surface. In this case, a projection surface can be dispensed with. If the shutter device 3 is in a state of increased transparency, in particular an open state, no information that can be displayed by means of the projection device 4 is usually provided and the user N can perceive the environment through the open shutter device.

By selecting the switching frequency of the shutter device, the perceptual quality for the user can be influenced. By opening and closing the shutter device, two different optical impressions are made detectable for the user within a short period of time, on the one hand the information provided by the projection device 4, on the other hand the surroundings.

By selecting the switching frequency, separate impressions can be provided for the user, in particular below 25 Hz, or—if desired—specifically mixed images for the user from the environment and the information provided at a frequency above 25 Hz or more.

The mixed images are created due to the limited temporal resolution of the human eye. Preferably, the switching frequency is selected such that the user can perceive the environment and the information provided by the projection device separately. Preferably, the switching frequency is in a range from 0.1 Hz to 25 Hz, in particular in a range from 1 to 20 Hz.

The projection device 4, the shutter device 3, as well as a separate projection surface, if present, are further connected by means of a control device 6 and are controllable by means of the control device 6. The control device 6 is preferably integrated in the support frame 2 of the spectacle element 1 or arranged on the support frame 2.

Furthermore, the eyeglass element 1 comprises a first sensor 7 and a second sensor 8. The first sensor 7 serves to detect the brightness of the environment in which the eyeglass element 1 is used. The second sensor 8 serves to detect light intensity pulses with a light intensity frequency from optical information sources external to the device, not shown in FIG. 1, which are suitable for emitting a light intensity frequency, in particular in a range from 50 Hz to 1000 Hz. Photosensors, such as photodiodes, can be used for both purposes.

The first sensor 7 and the second sensor 8 do not necessarily have to be designed as separate sensors. The sensors 7 or 8 can also be realized as one sensor comprising both functionalities.

The control device 6 is designed to operate the shutter device 3 and the projection device 4 in a coordinated and controlled manner, if necessary using further devices not shown, such as drivers for the shutter device or the projection device.

The shutter device 3 can be switched between a state of increased transparency and a state of reduced transparency by means of the control device 6. Preferably, it can be switched between a transparency of 0% light transmission and 100% light transmission. In particular, a switchable liquid crystal light valve can be used for this purpose. Typically, such light valves can be switched with sufficiently high frequency.

Furthermore, the control device 6 is designed to variably set the values of the increased transparency and/or the decreased transparency, duration of the time intervals of the increased transparency and/or the decreased transparency, as well as the switching frequency, i.e. the period length for the transparency change.

Furthermore, by means of the control device 6, the projection device 4 can be controlled, in particular light intensity of the projection device 4. In particular, by means of the control device 6, the projection device 4 can be operated with a light intensity frequency which is at most 25 Hz.

In this case, the emission of the projection device 4 is switched between an increased intensity and a decreased intensity after a predeterminable time. The increased intensity and the decreased intensity, as well as the associated time intervals can be preset by means of the control device 6.

Preferably, the state of increased light intensity comprises a value of more than 500 lux, in particular more than 1000 lux, in particular more than 10000 lux, in particular more than 100000 lux, in particular more than 500000 lux, in particular more than 1000000 lux. The state of lowered light intensity is preferably less than 100 lux or preferably less than the increased light intensity by at least a factor of 100, insofar as the increased light intensity is 1000 lux or more.

The control device 6 is further designed to variably set, in addition to the values for the increased and the decreased light intensity, the duration of the time intervals of the increased and/or the decreased light intensity as well as the light intensity frequency.

The control device 6 is designed in such a way that by means of it the operation of the shutter device 3 and the projection device 4 can be synchronized, i.e. the switching frequency of the shutter device can be adapted to the light intensity frequency of the projection device 4 or vice versa, in particular in such a way that the time interval of the reduced transparency coincides with the time interval of the increased light intensity. In particular in static operation this can be done by means of the control device 6 using a phase loop control.

Figure 2:
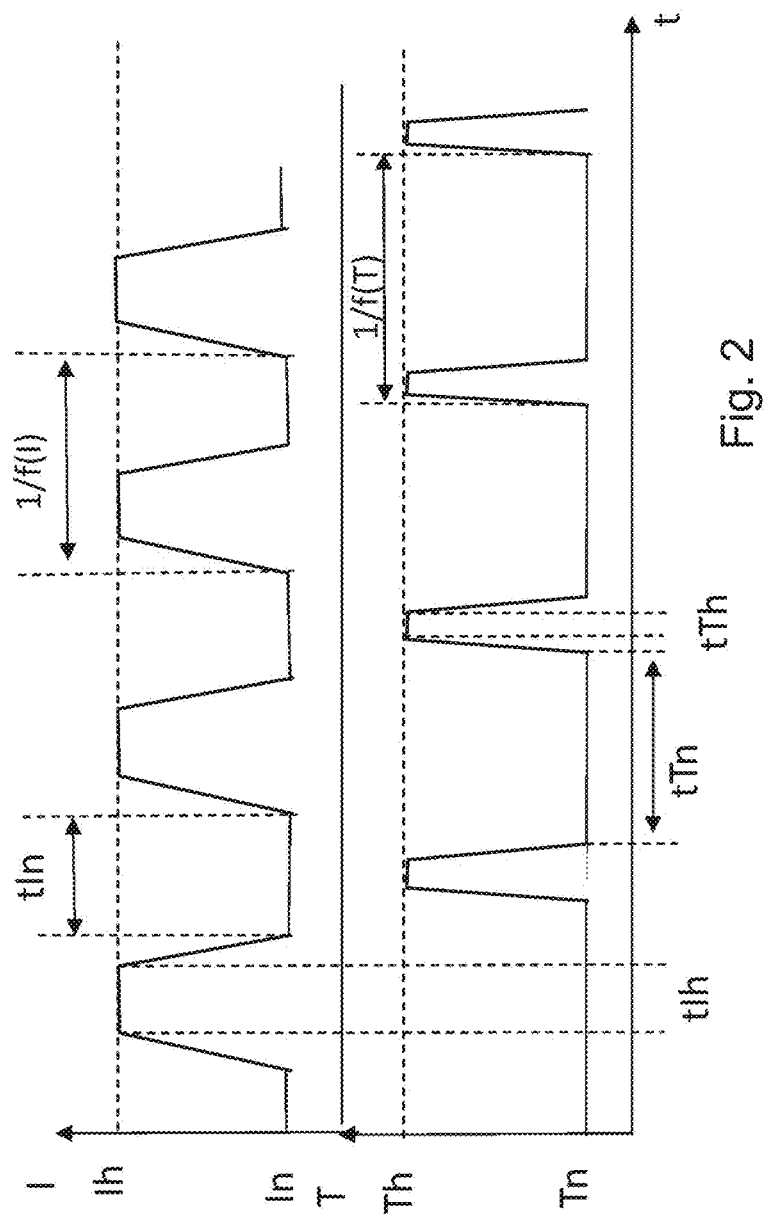
FIG. 2 is a schematic view of a time course of a synchronized state of the shutter device and the projection device according to the invention.

FIG. 2 shows a schematic representation of a time history for the transparency T of the shutter device and the light intensity I of the projection device. The transparency T and the light intensity I are plotted over a common time axis t.

In particular, FIG. 2 shows a synchronized state of the shutter device and the projection device. The switching frequency f(T) of the transparency T defines the period length 1/f (T), i.e. a "round trip" for the transparency T, e.g. from a state of reduced transparency Tn to a state of increased transparency Th and back to the state of reduced transparency Tn. The light intensity frequency f(I) defines the period length 1/f(I), i.e. a "round trip", for the light intensity I, e.g. from a state of decreased light intensity In to a state of increased light intensity Ih and back to a state of decreased light intensity In again. FIG. 2 shows a corresponding light intensity frequency f(I) and switching frequency f(T).

FIG. 2 shows that the duration of the time interval tIh of the increased light intensity Ih is always shorter than the time interval tTn of the decreased transparency Tn. According to FIG. 2, the time interval tIh of the increased light intensity Ih—with synchronization present—is always within the time interval tTn of the reduced transparency Tn. When the information is displayed by means of the projection device, the shutter device is already in the state of reduced transparency Tn, which increases the contrast for the user at a given increased light intensity Ih.

Ideally, reaching the state of reduced transparency Tn and the increased light intensity Ih are coordinated with each other in such a way that the best possible contrast for the user is achieved. This is possible in particular if the projection device can be switched sufficiently quickly, i.e. with steep ramps, between the increased light intensity Ih and the reduced light intensity In and vice versa.

This applies in a corresponding manner to the shutter device. If the projection device and the shutter device comprise the same or similar or very fast switching behavior, they can be switched "simultaneously".

If the projection device and the shutter device exhibit different switching behavior when switching from the reduced level, i.e. reduced transparency Tn or reduced light intensity In, to the increased level, i.e. increased transparency Th or increased light intensity Ih, at the desired frequency between the reduced and increased level, it is advantageous to first switch the device which comprises the temporally "flatter" ramp, i.e. switches more slowly. As soon as this has reached a desired threshold value, the "faster" of the two devices can then be switched to improve the display for the user.

The shutter device and the projection device can preferably be synchronized or controlled by means of a phase loop control. Thereby, both the shutter device and the projection device can form the input signal for the phase locked-loop control, also referred to as phase locked-loop or PLL, in particular depending on the individual switching behavior of the two devices. By using a phase locked loop, an efficient regulation/control can be performed based on the phase relationship of the transparency T and the light intensity I, in particular the time intervals of the reduced transparency Tn and the increased light intensity Ih can be synchronized by means of the phase locked loop.

In particular, the control device can be designed to allow the input signal for the phase loop control to be changed from the shutter device to the projection device or from the projection device to the shutter device.

The time interval tIh of the increased light intensity is preferably selected to be long enough for the user to perceive the displayed information well, but as short as possible under this condition in order to keep the energy consumption of the projection device as low as possible. The same applies to the temporal course of the transparency. The state of increased transparency should be sufficiently long to allow the user to perceive the environment, but downstream of the aforementioned condition also as short as possible to allow the best possible contrast for the display of information during the time interval of reduced transparency for the user. In this way, it can be achieved, for example, that the contractual setpoint value of the increased light intensity Ih can be reduced while the information continues to be perceived well by the user, which reduces the energy requirement of the projection device.

The nominal value of the increased light intensity Ih is preferably significantly increased compared to the ambient light to which the user is exposed and in particular is greater by a factor of 100 than the nominal value of the decreased light intensity In.

In particular, the setpoint value of the increased light intensity Ih and/or the setpoint value of the decreased light intensity In can be adjusted by means of the control device. Furthermore, the time interval tIh of the increased light intensity Ih and/or the time interval tin of the decreased light intensity In can also be adjusted by means of the control device.

In particular, the set value of the increased transparency Th and/or the set value of the decreased transparency Tn as well as the time interval tTh of the increased transparency Th and/or the time interval tTn of the decreased transparency tTn can be set by means of the control device. Furthermore, the set value of the increased light intensity Ih and/or the set value of the decreased light intensity In as well as the time interval tIh of the increased light intensity Ih and/or the time interval tIn of the decreased light intensity In can be set by means of the control device. In this respect, a pulse width modulation of the light intensity and/or the transparency can be performed by means of the control device. Such an adjustment of the time intervals, of the transparency values and/or of the light intensities can take place in particular depending on the ambient brightness, which can be detected by the first sensor.

Figure 3:
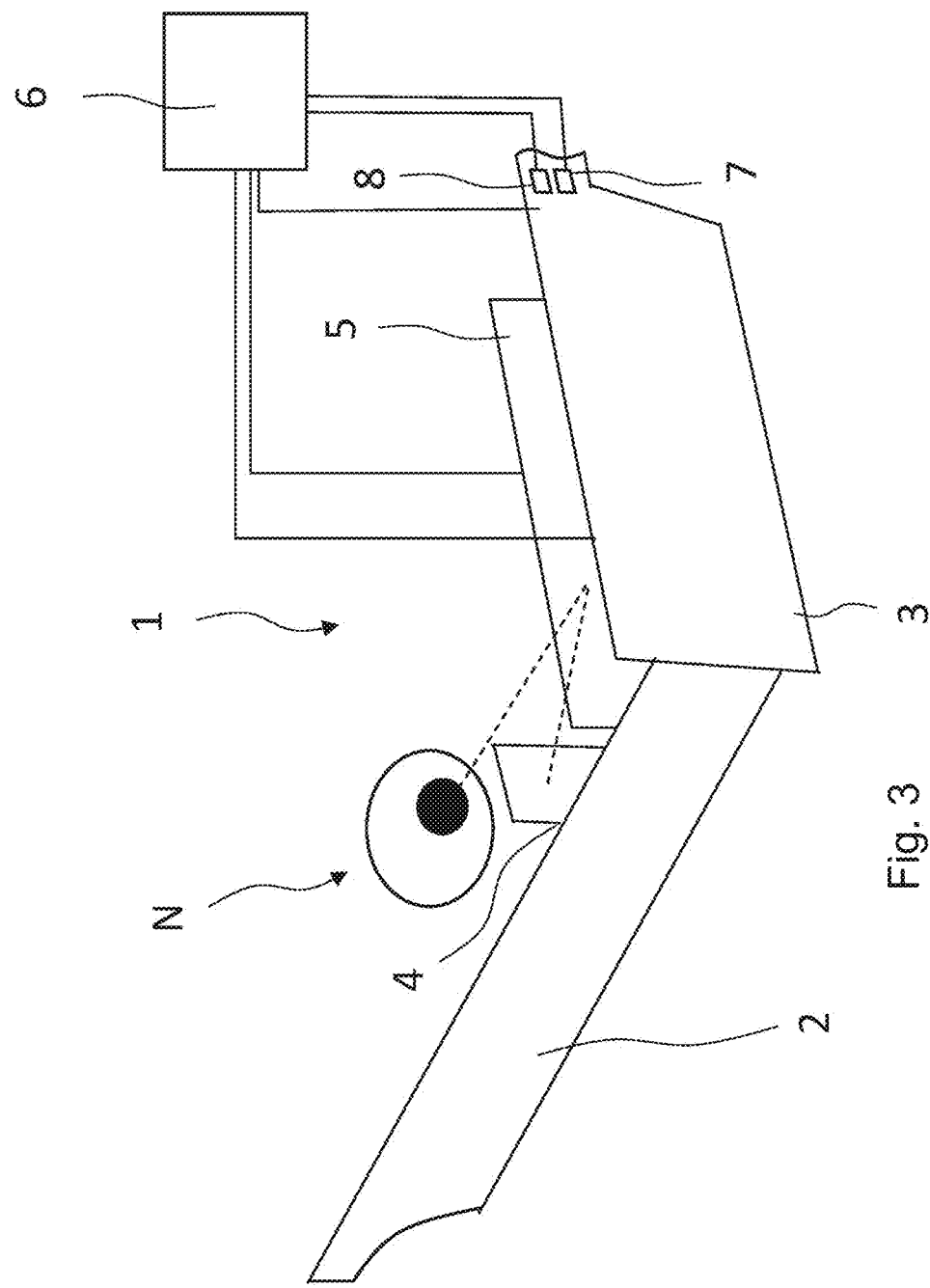
FIG. 3 is a schematic view of a spatial arrangement according to a first device configuration according to the invention, FIG. 4 a schematic view of a spatial arrangement according to a second device configuration according to the invention, FIG. 5 a schematic view of a spatial arrangement according to the second device configuration in combination with an optical information source external to the device according to the invention, FIG. 6 a schematic view of a time course of a synchronized state of the shutter device, the projection device and the optical device-external information source, FIG. 7 a schematic flow chart of a method for displaying information between a configuration of the device and an optical information source external to the device according to the invention, and FIG. 8 a schematic view of a spatial arrangement according to a third device configuration according to the invention.

FIG. 3 shows a schematic spatial arrangement of a device 1. Starting from the eye of the user N, a projection surface 5 is arranged in the viewing direction, which serves to display information by means of the projection device 4. Information can be displayed on this surface by means of the projection device 4, which can be perceived by the user N. Further in the viewing direction, on the side of the projection surface 5 facing away from the user N, a shutter device 3 is arranged. These are all attached at least indirectly to the support frame 2.

The projection surface 5 can comprise a waveguide which receives the light beam of the projection device 4 according to a preferred embodiment of the invention, wherein the waveguide comprises an incoupling grating or input grating that couples light from the outside of the waveguide into the waveguide as propagating light. Such waveguides can be of different types, but as an example are described in WO2019/185978 of the Applicant Dispelix OY filed on Mar. 11, 2019, wherein the content of WO2019/185978 is hereby incorporated by reference regarding waveguides.

FIGS. 2 and 3 of WO2019/185978 each show an embodiment of a waveguide with an incoupling grating that could be used as projection surface 5 of FIG. 3 of the invention.

Preferably—but not shown for reasons of clarity—the eye can be shielded from ambient light 360° around the viewing direction.

The first sensor 7 and the second sensor 8 are arranged on the side of the device facing the surroundings in the viewing direction, in particular on the shutter device 3. The first and second sensors 7 and 8 respectively can also be arranged on the carrier frame 2 or at another position of the device 1, but these should be arranged in such a way that they comprise a "free view" in the direction of view away from the device 1. At such a position, it is possible to detect the ambient brightness in a suitable manner. On the other hand, if necessary, a light intensity frequency of an optical information source external to the device can be advantageously detected.

The shutter device 3, the projection device 4, the projection surface 5, the first sensor 7 and the second sensor 8 are each connected to the control device 6. The control device 6 is shown "separated" in FIGS. 3 to 5 for display reasons. However, this is part of the device 1 and is structurally accommodated within or on one of the components of the device 1, the carrier frame 2.

By means of the control device 6, the shutter device 3, the projection device 4 and the projection surface 5 are controllable. Thus, the projection surface 5 can also be designed as a component switchable in its transparency, whereby this can be switched between different states for the display of information for the user N. For example, a first state can be assigned to the display of information by means of the projection device 4, so that this acts as a reproduction surface for the information to be displayed. In a second state, the user N can perceive the environment through the projection surface 5 and/or information from an optical information source external to the device, not shown in FIG. 3. The control device 6 can switch the projection surface 5 between these states.

In one configuration of the device 1 it may be necessary to consider a further phase shift between the light signal sequence of the projection device 4 and the shutter device 3 depending on the display behavior of the projection surface 5 in a phase locked loop.

If the projection surface 5 comprises an "inertia", i.e. a temporal delay of the representation of the information projected by the projection device 4, in particular with increased light intensity, this behavior of the projection surface 5 can be taken into account accordingly with regard to the synchronization of shutter device 3 and projection device 4.

Figure 4:
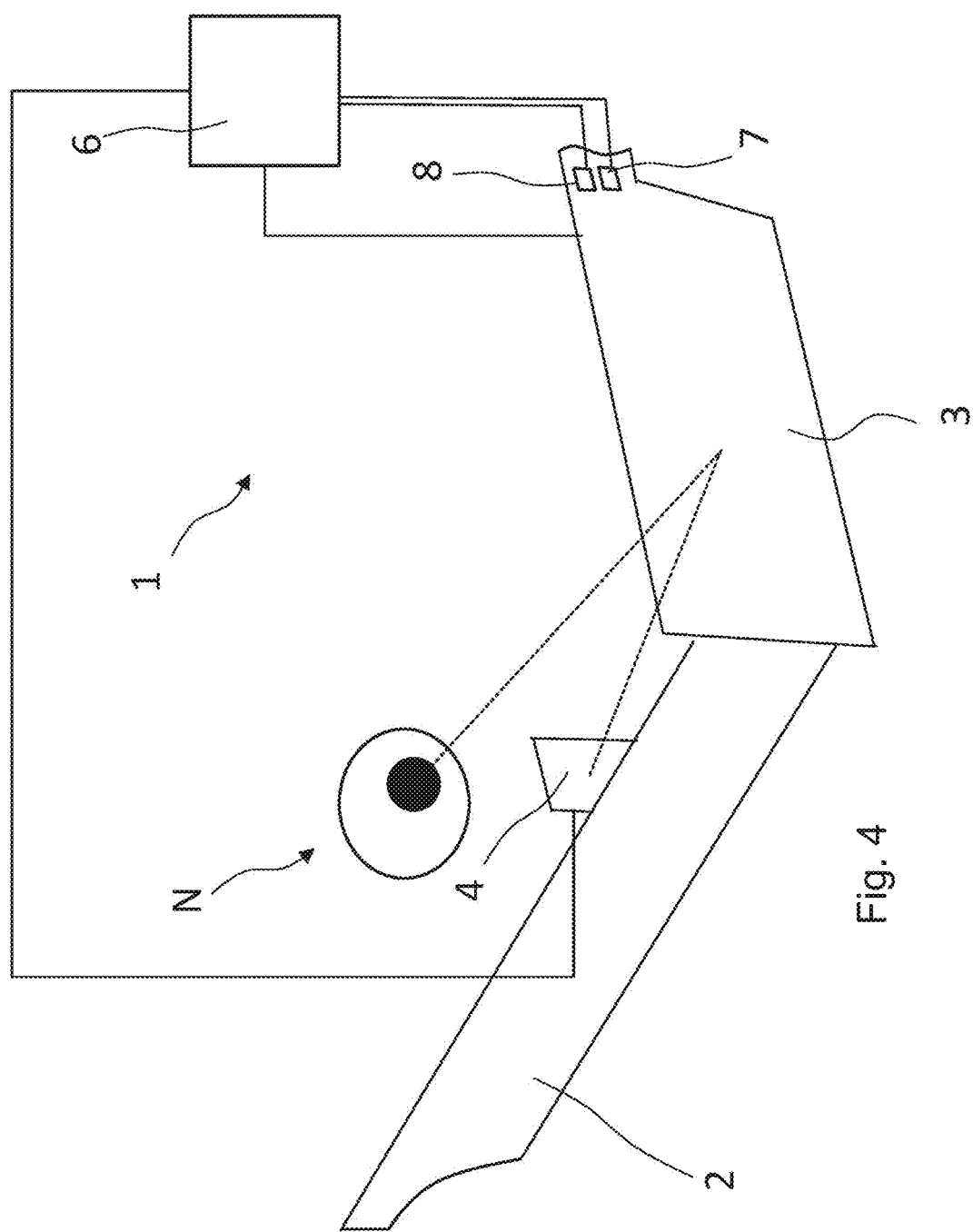

FIG. 4 shows a device 1 in which a projection is made by means of the projection device on the side of the shutter device 3 facing the user N. This is an advantageous design of the shutter device 3. This is an advantageous variant because, for example, a projection surface 5 as shown in FIG. 3 can be dispensed with and the device 1 thus loses weight. In this respect, the wearing comfort for the user N is further increased. Furthermore, the shutter device 3 obtains a dual function in that it switches the transparency and simultaneously acts as a projection surface when it is in the state of reduced transparency.

Further, this configuration without a projection surface allows for simplification with respect to coupling the device with an optical device-external information source, such as a smartphone display, since there is no longer a projection surface arranged between the optical device-external information source and the user's eye N. In this respect, no switching of a projection surface by the control device 6 is required.

Figure 5:
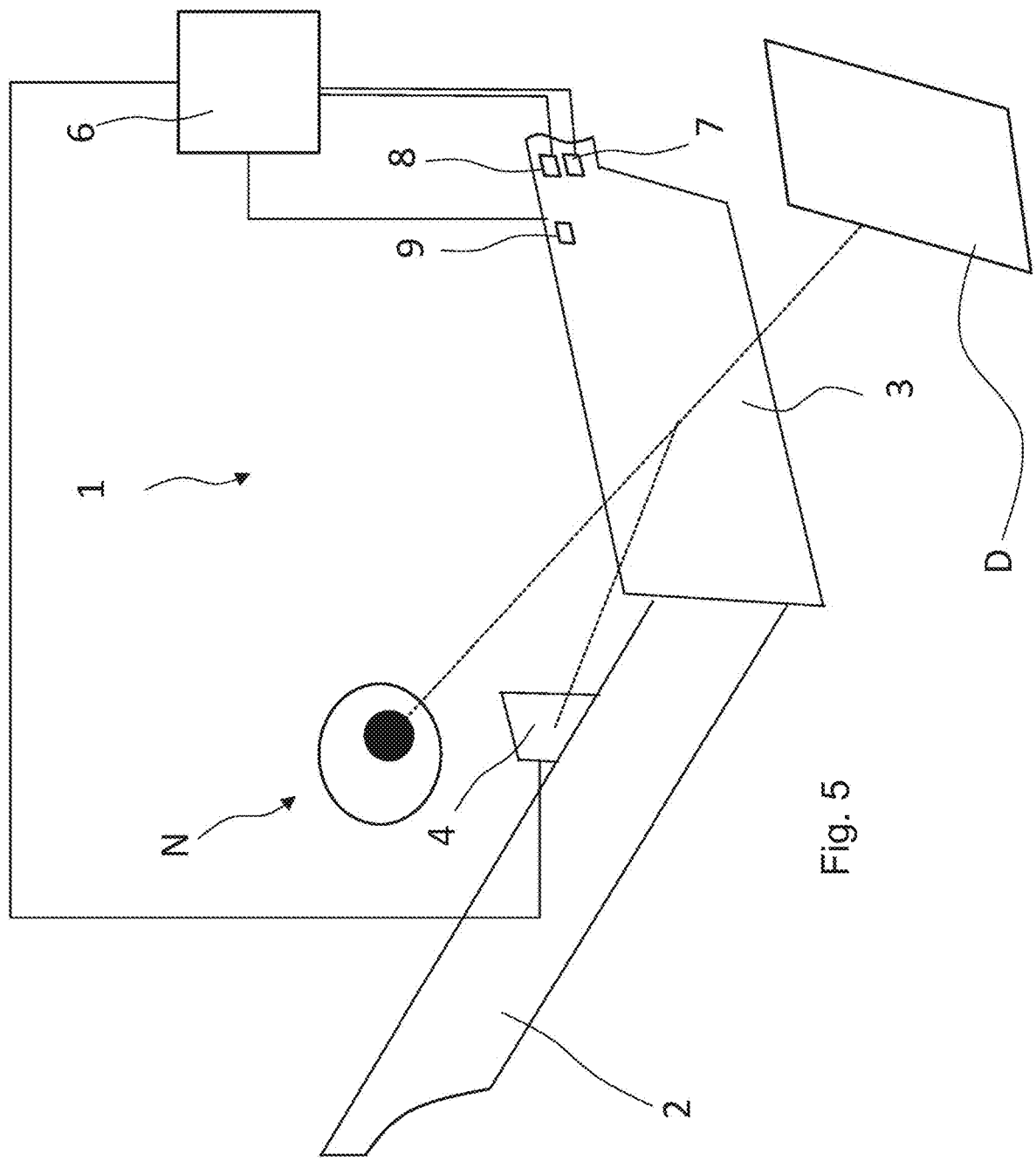

FIG. 5 shows a device 1 according to FIG. 4, which is used in combination with an optical information source D external to the device, shown here as a display D. In principle, an optical information source D external to the device can be any reproduction facility or device by means of which information can be made available to a user N by optical means.

In the same way, a device 1 according to FIG. 3 can be used, which, however, due to the presence of the projection surface 5, allows disadvantages with regard to the perception of information by means of information provided by an optical information source D external to the device.

By means of the second sensor 8, an emitted light intensity frequency of the display D is detected. This requires that the display D is suitable for emitting a corresponding light intensity frequency via the display D. The light intensity frequency is preferably in a range up to 25 Hz, if the user desires a "parallel" reproduction of information via the projection device 4 and via the optical device-external information source D. In this case, the optical device-external information source virtually assumes the role of the environment to be perceived.

However, the light intensity frequency of the optical device-external information source D may also be higher than 25 Hz, in particular if the projection device is not to be used during the viewing of the display D by the user, i.e. no information is to be projected into the user's field of view by means of the projection device 4.

In this case, the operation of the shutter device 3 can be arbitrarily adjusted to the light intensity frequency of the optical device-external information source. Light intensity frequencies of 50 Hz or more, in particular 100 Hz or more, can be provided here for flim-mer-free presentation of the information of the display. Also, correspondingly high nominal values of the increased light intensity of the optical information source external to the device can be used here, since a contrast for the user to the environment can be enhanced by this. Thus, it can be provided that the set value of the increased light intensity is higher than the light intensity of the environment by at least a factor of 100.

On the basis of the detected values of the sensor 8, an adaptation or synchronization of the operation of the shutter device 3 with regard to the detected light signal sequence, in particular the light intensity frequency, as well as the time and time intervals of the increased light intensity, from the display D takes place. In particular, synchronization takes place in such a way that, preferably in a repetitive manner, the time interval of the increased light intensity of the display D is arranged, preferably completely, within the time interval of the increased transparency. More detailed explanations in this regard are given in connection with the description of FIG. 6.

If a display of information by means of the projection device 4 is also desired at the same time, the projection device is synchronized in relation to the shutter device 3 in such a way that the time interval of the increased light intensity of the projection device is arranged, preferably completely, within the time interval of the reduced transparency.

This enables a "parallel" perception for the user of information which is provided by means of the projection device and which is provided by means of the optical device-external information source D.

The device 1 may optionally also comprise an emitter, e.g. an LED, not shown in FIG. 5, which informs the optical device-external information source D that the device 1 requests a light intensity frequency, in particular a certain light frequency with a corresponding increased intensity and decreased intensity, as well as a certain temporal distribution of the increased and decreased light intensity.

This request can be based on the sensor value of the first sensor 7, which is determined by means of the control device 6 on the basis of the detected ambient parameter. The switching behavior of the shutter device 3 is then adapted or synchronized to the intensity frequency of the display.

In a further embodiment, the device 1 comprises a camera 9 for capturing a content of an optical information source D external to the device. By means of the camera 9, information can be captured on the display D. If necessary, this captured information can be processed by the control unit 6 with regard to contrast enhancement, e.g. image processing can take place.

Subsequently, the information captured by the camera 9 and possibly processed can be made perceptible to the user N with improved contrast by means of the projection device 4 and the shutter device 3.

This enables contrast enhancement even for optical information sources D external to the device, which are not suitable for emitting light intensity pulses of desired duration in a desired light intensity frequency range.

Figure 6:
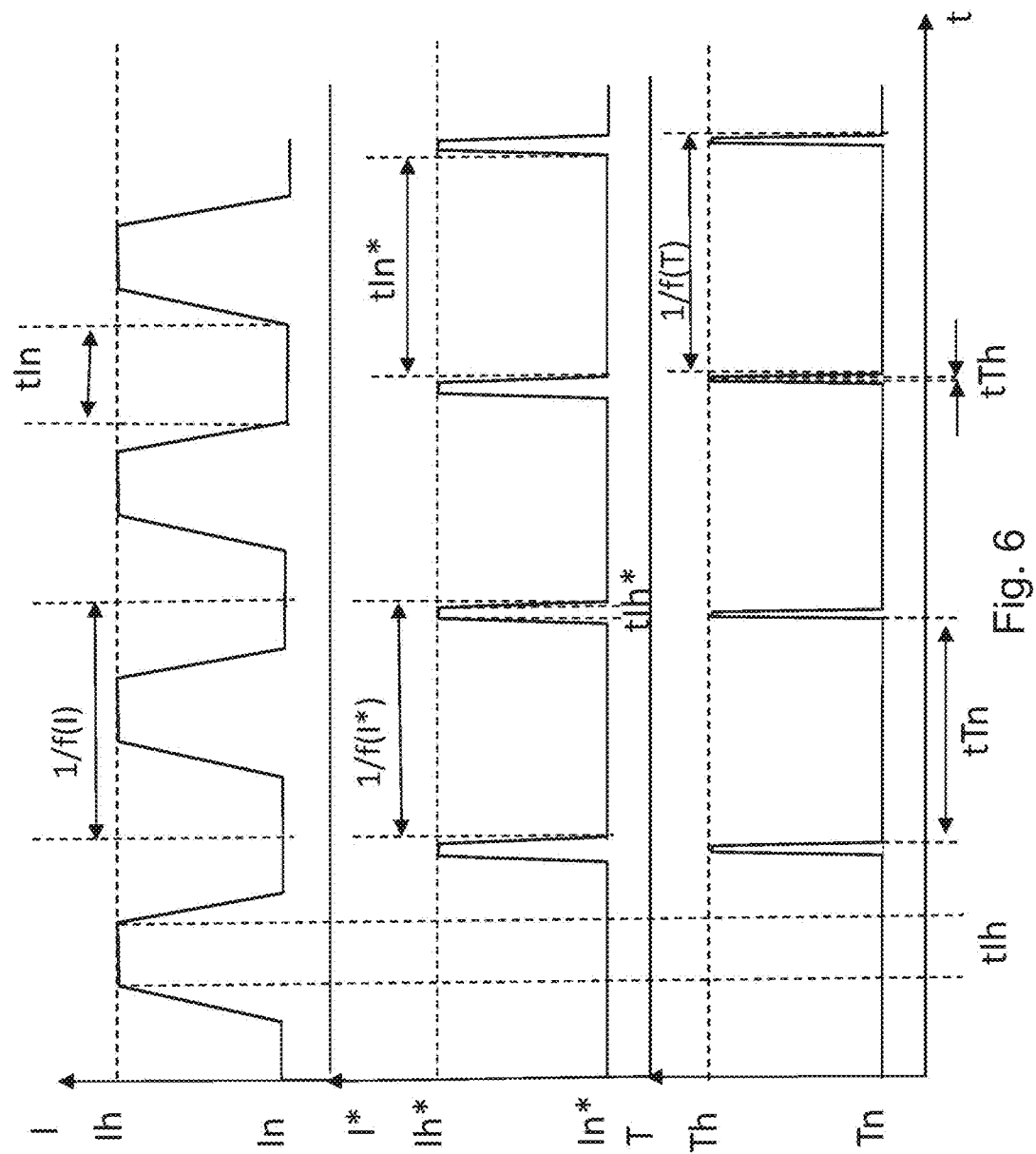

FIG. 6 shows a schematic representation of a time course of a synchronized state of the shutter device, the projection device and the optical device-external information source.

In addition to the time histories of the transparency T and the light intensity I of the projection device already shown in FIG. 2, FIG. 6 now shows—over the same time beam—the time history of the light intensity I* of the optical information source external to the device. This time course of the light intensity I* of the optical information source external to the device is shown in a synchronized state, whereby a "parallel" operation of the projection device and the optical information source external to the device takes place.

The course of the light intensity I* of the optical information source external to the device is inserted in FIG. 6 between the course of the light intensity I of the projection device and the course of the transparency. The designations of the increased light intensity of the decreased light intensity, the associated time intervals, etc., are based on the corresponding reference signs for the light signal sequence of the projection device and differ from these only by the addition of a "*" to clarify the assignment of the light signal sequence to the optical device-external information source.

FIG. 6 shows that the light intensity sequence I* of the optical device-external information source comprises a light intensity frequency f(I*) which is equal to the switching frequency f(T) and equal to the light intensity frequency f(I) of the projection device. However, the increased light intensity Ih* of the optical information source external to the device is distributed differently in time relative to the temporal course of the transparency T than the increased light intensity Ih of the projection device.

As already explained for FIG. 2, the increased light intensity Ih of the projection device is always present in a time interval tTn of the decreased transparency Tn. In contrast, the time interval tIh* of the increased light intensity Ih*always overlaps with a time interval tTh in which increased transparency Th is also present. This is due to the fact that the optical information source external to the device is located in front of the shutter device, i.e. it can only be perceived if the light emitted by the optical information source external to the device can reach the user's eye. Consequently, the light must be able to pass through the shutter device in a time interval tTh of increased transparency Th.

Preferably, the time interval tIh* of the increased light intensity Ih* is short compared to the time interval tIn* of the decreased light intensity In*, i.e. preferably at least ⅕, especially ⅒ or even shorter. This allows the application of high light intensities with simultaneously low energy consumption of the optical device-external information source to improve the display for the user.

Furthermore, the time interval tIh* of the increased light intensity Ih* is longer than the time interval tTh of the increased transparency Th. This ensures that when the state of increased transparency Th is reached, the full increased light intensity Ih* of the optical device-external information source is already present. Preferably, there is a time interval between the end of the time interval tIh of the increased light intensity Ih of the projection device and the switching from a reduced transparency Tn to an increased transparency Th. This allows the user's eye a greater separation between the information provided by the projection device and the optical device-external information source.

In the mode of operation shown, the light intensity frequency of the projection device and the optical device-external information source is at most 25 Hz, preferably between 1 and 20 Hz.

If the projection device is not used any further, the light intensity frequency of the optical information source external to the device can be increased significantly, in particular above 60 Hz, in order to make the information from the optical information source external to the device perceptible to the user in a flicker-free and high-contrast manner.

Figure 7:
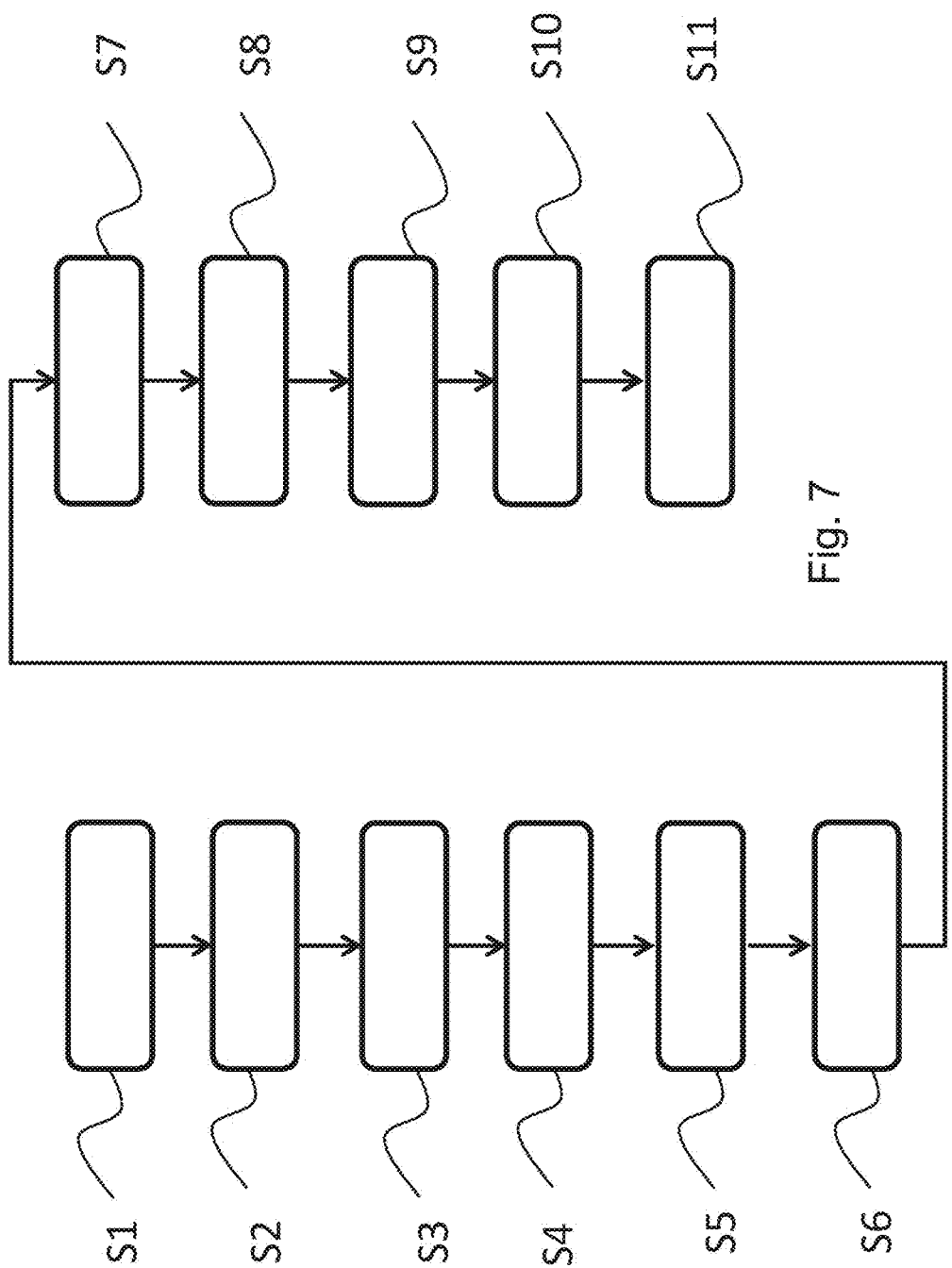

FIG. 7 shows a schematic flow chart for a method of displaying information in the interaction of a device disclosed in the context of this application and an optical information source external to the device. The method can be carried out, for example, in a constellation according to FIG. 5.

In a method step S1 the control device detects with which light intensity frequency the projection device will emit or emits visible light within a light signal sequence for the presentation of information to a user.

In a method step S2, a switching frequency of the shutter device is synchronized with the detected light intensity frequency, so that the period length of the temporal transparency sequence and the period length of the light intensity match.

In a next method step S3, the switching frequency and the light intensity frequency are synchronized in such a way that a time interval of the increased light intensity coincides with a time interval of the decreased transparency, in particular a time interval of the decreased transparency completely comprises a time interval of the increased light intensity.

In a next method step S4, a phase-correct display of the information is performed on the shutter device acting as a projection surface. Thus, the shutter device is used as a projection surface in the correct phase in the time interval of the reduced transparency. In a time interval of increased transparency, the user can perceive the environment.

In a method step S5, the ambient brightness is detected to further improve the presentation of the information.

In a method step S6, the light intensities and the time intervals are adapted, in particular as pulse height and/or pulse width modulation, for the light signal sequence and, adapted to this, the switching frequency is synchronized in such a way that the display for the user, in particular the contrast, is increased depending on the detected ambient brightness. This adaptation can take place dynamically on the basis of the continuously detected ambient brightness. The synchronization between light signal sequence and switching frequency is performed by means of a phase-locked loop.

In a process step S7, it is checked whether an optical information source external to the device is within range of the second sensor. If this is the case, the device uses the second sensor to detect a light signal sequence comprising a light intensity frequency from the optical information source external to the device, in this case a display, in a method step S8. The light intensity frequency detected by the sensor is fed to the control device. The sensor supplies not only the light intensity frequency, but also the duration of the time interval of the increased light intensity, the duration of the time interval of the decreased light intensity and the switching time for the light intensity.

After detection of the light signal sequence of the optical information source external to the device, the user is informed that a synchronization with an optical information source external to the device can take place. The user can decide whether such a synchronization should take place.

In a process step S9, a decision is made as to whether, in addition to the display of information by means of the optical information source external to the device, a display of information by means of the projection device is also desired.

If this is the case, the shutter device is activated. In a process step S10, the switching frequency of the shutter device is synchronized to the detected light intensity frequency and the temporal distribution of the increased and decreased light intensity of the optical information source external to the device. At the same time, the light intensity frequency of the projection device is adjusted or tracked to the light intensity frequency of the optical device-external information source or to the switching frequency of the shutter device.

The synchronization takes place in such a way that a state of increased transparency repeatedly coincides in time with the increased light intensity of the optical information source external to the device. This is done by means of a phase-locked loop. For this purpose, the second sensor can continuously detect the light signal sequence, in particular the light intensity frequency, the time intervals of the increased and decreased light intensity and the amplitude of the light intensity, of the optical device-external information source.

In a method step S11, the information provided by the optical device-external information source is made perceptible in a repetitive manner whenever the transparency is increased and the optical device-external information source emits an increased light intensity. I.e., in this case, too, a representation is made available to the user in a phase-correct manner and, in the process, an improved contrast is achieved for the user. Furthermore, in the state of reduced transparency, the information of the projection device is projected onto the shutter device.

Figure 8:
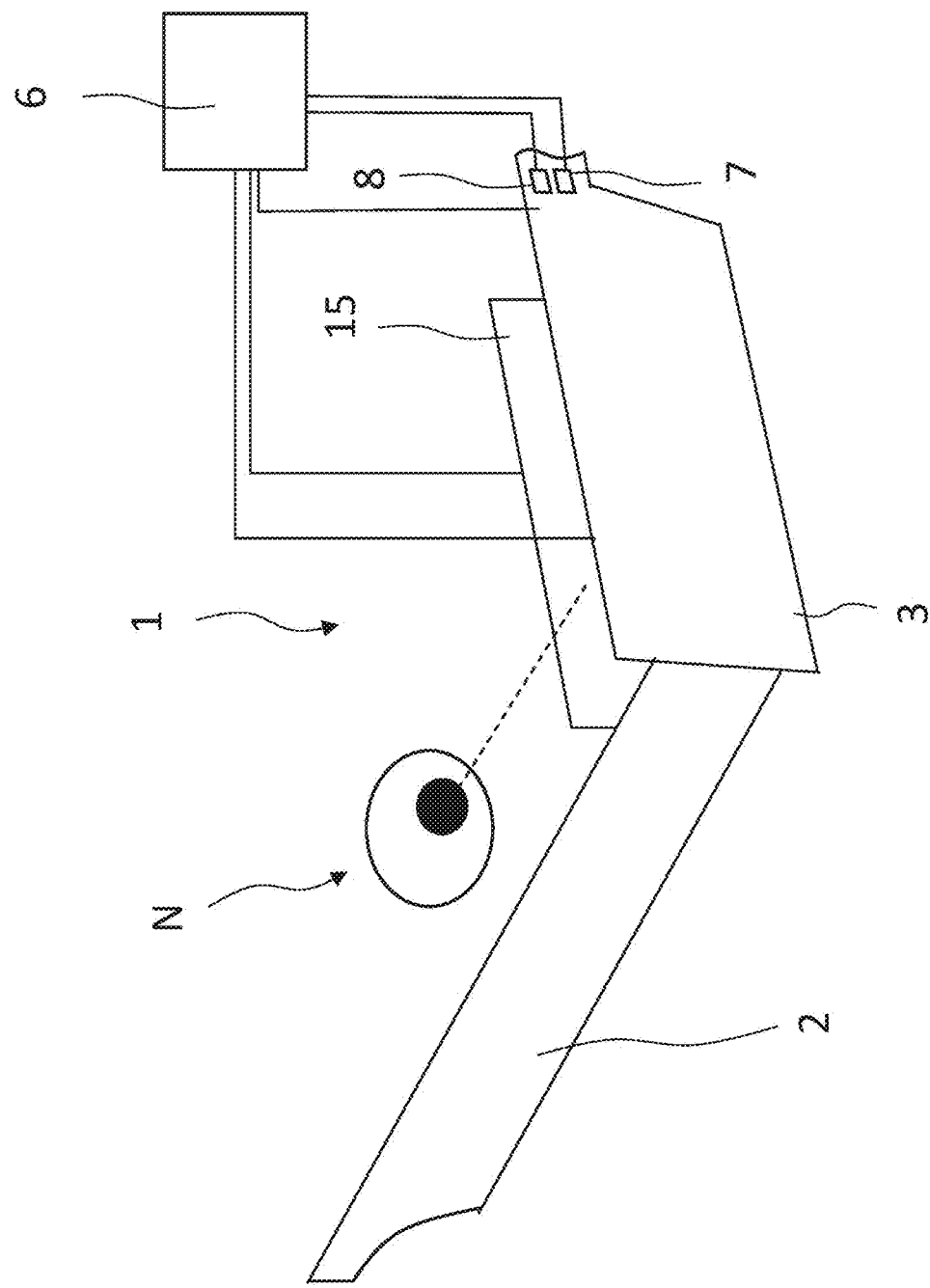

A further embodiment of the invention is shown in FIG. 8 which is similar to the embodiment of FIG. 3 wherein the projection surface 5 is replaced by an integral waveguide 15 which comprises an integral image projector from which light is further directed to an outcoupling grating or output grating. Thus, a projection device 4 of FIG. 3 is not needed in the embodiment of FIG. 8 which has an integral image projector inside the integral waveguide 15. As an example of such an integral waveguide 15 it is hereby referenced to FIG. 4 of WO2019/185978. As can be taken from FIG. 8 the integral waveguide 15 is connected to control device 6 wherein the functionality of the further elements of the embodiment of FIG. 8 are in parallel to the embodiment of FIG. 3 of the invention.

Preferably, the device can be coupled by means of the optical information source external to the device, so that, for example, prior to the start of the presentation by the optical information source external to the device, it can be communicated whether its operation in a combined operation of projection device and optical information source external to the device is to take place, or whether a singular operation of the optical information source external to the device is intended. Furthermore, such a coupling allows the display to be optimized even after start-up, e.g. by requesting an optimized light signal sequence composition of the optical information source external to the device from the optical information source external to the device for optimized display for the user on the basis of the determined ambient brightness.

The method is performed until the optical device-external information source no longer emits a light intensity frequency or is removed from the detection range of the sensor. Also, the projection device may be disabled and the display for the optical device-external information source may be optimized by adjusting the switching frequency to an increased emitted light intensity frequency. Also, the device can be turned off completely.

Since the devices and methods described in detail above are examples of embodiments, they can be modified in a customary manner by the skilled person to a wide extent without leaving the scope of the invention. In particular, the mechanical arrangements and the proportions of the individual elements with respect to each other are merely exemplary.

Thus, according to the invention, a method and a device (1) for displaying information to a user (N) is described, comprising a support frame (2) for mounting the device (1) on a body part, in particular on the head, of a user (N), comprising a shutter device (3) which is mounted by means of the support frame (2) and can be switched between a state of increased transparency (Th) and a state with lower transparency (Tn) for visible electromagnetic radiation relative to the state of increased transparency (Th), comprising a projection device (4) which is mounted by means of the carrier frame (2) and by means of which visible electromagnetic radiation for the display of information can be emitted in such a way that this can be perceived by the user (N), the shutter device (3) and the projection device (4) being arranged relative to one another in such a way that, during a state of reduced transparency, information can be displayed by means of the projection device (4) for the user (N), in particular on a projection surface surrounded by the shutter device.

REFERENCE LIST 1 device
2 carrier frame
3 shutter device
4 Projection device
5 Projection surface
6 control device
7 first sensor
8 second sensor
9 camera
15 integral waveguide
T Transparency
Th Transparency, increased state
Tn Transparency, lower state
I Light intensity
Ih Light intensity, increased
In Light intensity, decreased
t time
tIh Duration of the time interval of increased light intensity
tIn Duration of the time interval of decreased light intensity
tTh duration of the time interval of increased transparency
tTn duration of the time interval of lower transparency
D optical information source external to the device: display
S1 Detection of the light signal sequence, in particular the light intensity frequency, of a projection device
S2 Synchronization of the switching frequency of the shutter device with the light intensity frequency of the projection device
S3 synchronization of the switching frequency and the light intensity frequency of the projection device in such a way that a time interval of the increased light intensity coincides with a time interval of the reduced transparency
S4 phase correct display of the information of the projection device during a state of reduced transparency
S5 detection of the ambient brightness
S6 adjusting the light signal sequence to optimize the display based on the detected ambient brightness
S7 checking whether optical device-external information source is present in the detection area of the second sensor
S8 Detection of the light signal sequence comprising a light intensity frequency of the optical device-external information source
S9 selection of the display option—only information of the optical information source external to the device or combination of information of the optical information source external to the device and the projection device
S10 Synchronization of the light signal sequence of the optical information source external to the device, the switching frequency of the shutter device and the light intensity frequency of the projection device
S11 Phase correct display of the information of the optical device external information source and the information of the projection device.

The invention claimed is:

1. A device for displaying information for a user, comprising a support frame for mounting the device on a body part of a user, comprising a shutter device which is mounted by the support frame and can be switched between a state of increased transparency and a state with lower transparency for visible electromagnetic radiation relative to the state of increased transparency, comprising a projection device which is mounted by the carrier frame and by which visible electromagnetic radiation for displaying information can be emitted in such a way that this can be perceived by the user, the shutter device and the projection device being arranged relative to one another in such a way that, during a state of reduced transparency, information can be displayed by the projection device for the user, wherein the visible electromagnetic radiation emittable by the projection device for the representation of information is emittable by a light signal sequence with a light intensity frequency, wherein the light intensity frequency is emitted as a sequence of a time interval with increased light intensity, of a time interval following this time interval with reduced light intensity up to a time interval following this time interval with increased light intensity, and wherein the light intensity in a time interval of increased light intensity and the light intensity in a time interval of reduced light intensity differ at least by a factor of 5.

2. The device according to claim 1, wherein the duration of the time interval with increased light intensity is at most ⅕ of the duration of the time interval of decreased light intensity.

3. The device according to claim 1, wherein a switching frequency of the shutter device and the light signal sequence of the projection device can be synchronized by a control device in such a way that the switching frequency of the shutter device and the light signal sequence of the projection device can be synchronized by a control device, that the switching frequency of the shutter device and the light intensity frequency of the projection device substantially coincide or are an integer multiple of each other.

4. The device according to claim 3, wherein the switching frequency of the shutter device and the light signal sequence of the projection device are synchronizable by a phase-locked loop.

5. The device according to claim 3, wherein the switching frequency of the shutter device and the light signal sequence of the projection device can be synchronized in such a way that the time interval of the increased light intensity is temporally arranged within a time interval of the reduced transparency.

6. The device according to claim 1,
comprising a first sensor for detecting a contrast-relevant environmental parameter, wherein the shutter device and/or the projection device is adjustable on the basis of the detected environmental parameter.

7. The device according to claim 6,
wherein at least one of the following parameters is adjustable on the basis of the determined ambient brightness: Setpoint value of increased light intensity, setpoint value of decreased light intensity, a duration of the time interval of increased light intensity, a duration of the time interval of decreased light intensity, a setpoint value of increased transparency, a set value of decreased transparency, a duration of the time interval of increased transparency, a duration of the time interval of decreased transparency, the frequency of light intensity, or the switching frequency of transparency.

8. The device according to claim 1,
adapted to synchronize the shutter device with a light intensity frequency of a light signal sequence of an optical device external information source and to make visible electromagnetic radiation emitted by the optical device external information source optically perceptible to the user.

9. The device according to claim 8,
comprising a second sensor which is designed to detect a light intensity frequency of the optical device-external optical information source, the switching frequency and the light intensity frequency being synchronizable on the basis of the detected values of the second sensor.

10. The device according to claim 1,
wherein the projection device transfers light to a waveguide as part of a projection surface which comprises an incoupling grating that couples light from projection device into the waveguide as propagating light which is further directed to an outcoupling grating to be observed by the user, or
wherein the projection device is integrated into an integral waveguide which comprises an integral image projector as projection device from which light is directed to an outcoupling grating to be observed by the user.

11. A method for displaying information for a user by the device according to claim 1, wherein a light signal sequence comprising a light intensity frequency is emitted for displaying information by the projection device, wherein the switching frequency of the shutter device and the light intensity frequency are matched to one another in such a way that an increased light intensity is present in a time interval of the reduced transparency, so that information provided by the projection device for the user can be perceived during this time interval.

12. The method according to claim 11,
wherein the light signal sequence emitted by the projection device is projected onto a projection surface encompassed by the shutter device during the time interval of the reduced transparency.

13. The method according to claim 11,
wherein the light signal sequence is detected from an optical information source external to the device for presenting information to a user, wherein the switching frequency of the shutter device and the light intensity frequency of the projection device are synchronized to the detected light intensity frequency of the optical device-external information source and the information provided by the optical device-external information source is displayed to the user during a time interval, in which simultaneously an increased transparency of the shutter device and an increased light intensity of the optical device-external information source are present.

14. The method according to claim 13,
wherein an overlap of a time interval of the increased transparency with a time interval of the increased light intensity of the optical device-external information source and/or an overlap of a time interval of the reduced transparency with a time interval of the increased light intensity of the projection device are matched to one another.

15. The method according to claim 13,
wherein the switching frequency of the shutter device is synchronized in such a way that the time interval of increased light intensity of the optical device-external information source comprises the time interval of increased transparency.

* * * * *